Nov. 18, 1958 M. D. NELSON ET AL 2,860,792
BOAT TRAILER
Filed Jan. 7, 1957
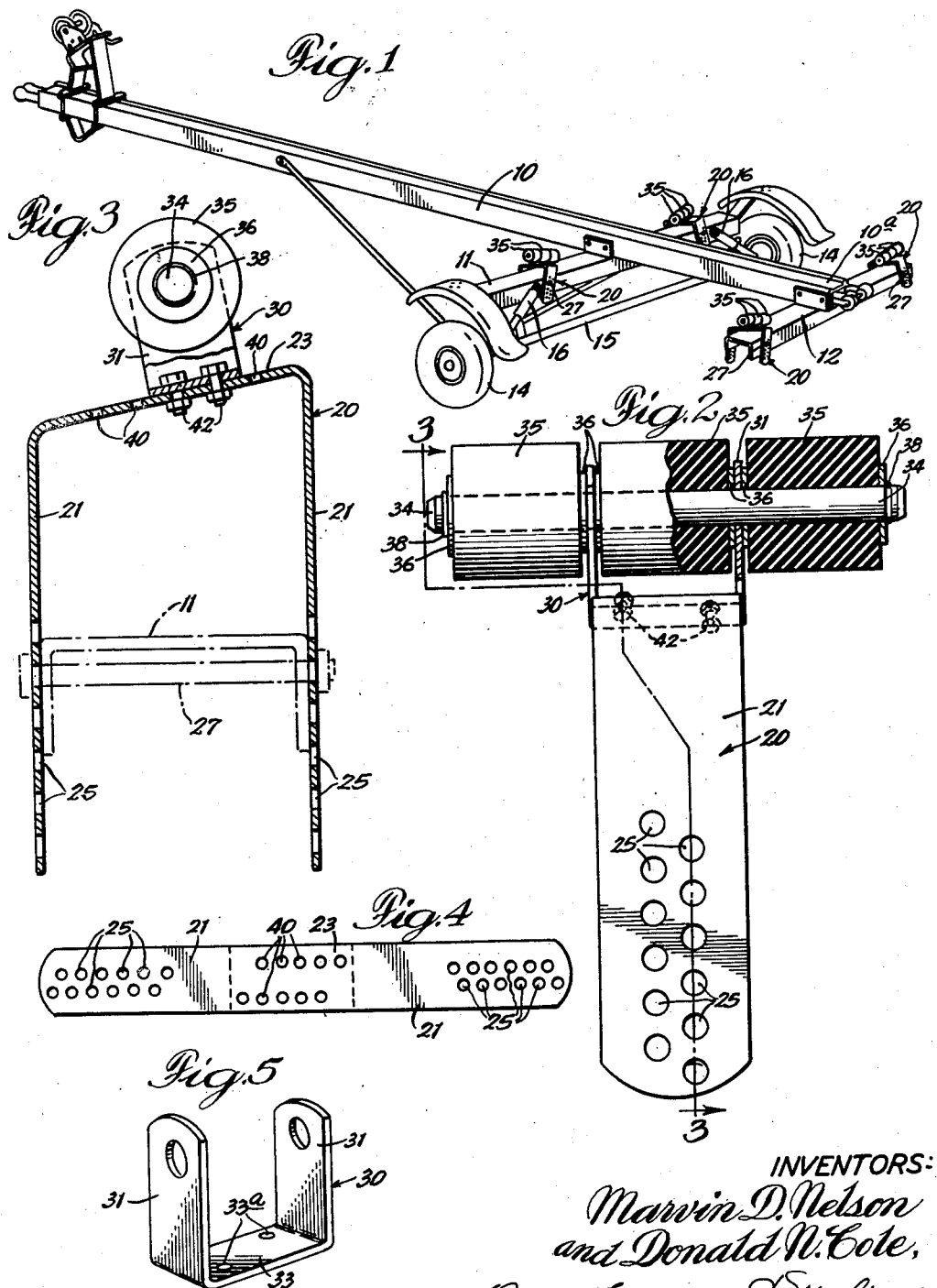
INVENTORS:
Marvin D. Nelson
and Donald N. Cote,
BY Baer, Freeman & Molinare
ATTORNEYS.

United States Patent Office 2,860,792
Patented Nov. 18, 1958

2,860,792

BOAT TRAILER

Marvin D. Nelson and Donald N. Cole, Hastings, Nebr., assignors to Dutton-Lainson Company, Hastings, Nebr., a corporation of Nebraska Application January 7, 1957, Serial No. 632,704

8 Claims. (Cl. 214—84)

This invention relates to trailers and more particularly to trailers of the type suitable for carrying boats, such as rowboats, motor boats and the like. Such trailers usually are constructed and arranged to be pulled behind an automobile or other vehicle.

Because the hull of boats to be handled on trailers vary greatly in size and shape, it long has been a problem to provide a trailer capable of properly supporting various sizes and shapes of boats. Generally, such trailers are provided with one or more sets of transversely spaced apart hull engaging and guiding devices which are connected to the trailer frame in a manner to provide for vertical adjustment. Such prior devices are so constructed that frequently proper support for certain sizes and/or shapes of boats is unattainable and which results in an unstable mounting or support for the boat, causing rocking or wobbling of the boat on the trailer, especially in transit. Such unstable mounting of the boat frequently results in damage to the hull of the boat and/or the finished surfaces thereof. Such difficulties are further emphasized when the trailer is constructed with two or more sets of hull engaging and guiding devices because of the necessity of endeavoring to provide a multiplicity of areas of contact by adjusting each device with respect to the adjacent surface area of the hull of the boat.

One of the objects of the present invention is to provide a novel form of boat hull engaging and guiding device which insures proper engagement and support for the hull of boats of a wide range of sizes and shapes.

Another object is to provide a novel hull engaging and guiding device which permits obtaining relatively fine adjustment in a manner so as to insure providing firm support and engagement with the hull of the boat.

A further object is to provide a novel form of boat hull engaging and guiding device which is durable, efficient in use and capable of being economically manufactured.

Other objects and advantages of this invention will be apparent from the following description taken in connection with the accompanying drawing, in which:

Figure 1 is a perspective view of a boat trailer provided with the novel form of hull engaging and guiding devices embodying the present invention;

Figure 2 is an elevational view of our novel hull engaging and guiding device, with portions broken away to show details of construction;

Figure 3 is a view, part in vertical section and part in elevation, through the hull engaging and guiding device, taken substantially as indicated at lines 3—3 on Figure 2;

Figure 4 is a view showing the inside surface of the main supporting bracket of the device, prior to forming into final shape; and Figure 5 is a perspective view of the roller mounting bracket adapted to be adjustably secured on the inclined top of the supporting bracket.

In Figure 1 of the drawings we have shown in perspective view a conventional boat trailer comprising a main longitudinal frame 10, of structural formation, and a pair of longitudinally spaced apart, transversely extending structural cross frame members 11 and 12. The main frame member constitutes a boom or drawbar, and the forward end thereof is adapted to be connected detachably to a conventional hitch secured to the rear end of a vehicle. The top surface of main frame 10 is formed with a longitudinally extending groove or channel 10a, for accommodating the keel of a boat therein. The trailer is supported by a pair of wheels 14, carried on axles secured in a tubular member 15, which in turn is interconnected with the front cross frame member 11, by suitable stabilizer arms 16, with coil springs (not shown) interposed between the cross member 11 and member 15. Hull engaging and guiding devices are usually provided to function in the nature of a cradle, adapted to engage the hull of a boat for supporting it upon the trailer.

As shown in the drawings, we provide two sets of hull engaging and guiding devices, with one set carried on each of the respective frame members 11 and 12. These devices are spaced apart transversely, on opposite sides of the main frame or boom 10, at a proper position so that they may be adjusted vertically and laterally for engaging the hull of a boat for supporting the same.

The hull engaging and guiding devices each comprise a main supporting bracket 20, formed of strap metal, defining a pair of spaced apart legs 21 and 22, interconnected at their upper ends by an inclined top portion 23. Each of the legs are provided with two spaced apart, vertically extending series of apertures 25, with the apertures of one series offset vertically with respect to the other and registering approximately midway between apertures of the other series. The bracket 20 is adapted to be secured by a bolt 27 to a cross frame member. By virtue of the two series of apertures 25 it is possible to so adjust the bracket 20, relative to its cross frame member, so as to dispose the top portion 23 at a desired height. If we assume that the spacing of the apertures 25, in each row, is ¾" then adjustment, in increments of ⅜", may be made by selecting the proper aperture through which the bolt 27 is to be extended. It is well known that vertical adjustment of the main supporting bracket, in increments as indicated, still does not insure proper positioning to insure firm contacting engagement with the hull of a boat.

The means associated with the main supporting bracket 20, for engaging the hull of a boat, may be either a roller type or may be in the nature of a pad, depending upon the construction and form or shape of the boat to be carried on the trailer. As shown in the drawings the hull engaging device comprises a roller mounting bracket 30, of U-shape form, having a pair of upstanding legs 31, in which is mounted a shaft 34, carrying three rollers 35, one of which is positioned between the legs 31. The rollers may be formed of any suitable material, but preferably are of rubber. At opposite ends of each roller is seated a washer 36, with the washers between a pair of adjacent rollers being positioned on opposite sides of the respective legs 31. The rollers and washers are maintained in assembled relation on the shaft 34 by snap rings 38, seated in grooves in the outer ends of the shaft 34. The bottom 33, of the bracket 30, is adapted to be mounted on the top portion 23 of the main supporting bracket 20.

The top portion 23 of the supporting bracket 20, is inclined from one leg to the other. While the angle of inclination of the top portion 23 may be varied over a substantial range, we have found it desirable to incline this top portion at an angle of approximately 9° to a horizontal plane, as viewed in Figure 3 of the drawings. The top portion is formed with two spaced apart, longitudinally extending series of apertures 40, which are arranged in offset relation, and with which a pair of offset apertures 33a, formed in the bottom 33 of the roller mounting bracket 30, are adapted to be selectively registered. The roller mounting bracket, together with the rollers assembled thereto, may thus be adjusted along the inclined top portion 23 of the main supporting bracket 20 to a desired position. By reason of the slight inclination of the top portion 23, the roller mounting bracket and its roller assembly may be adjusted along said top portion 23 so as to provide relatively fine increments of vertical adjustment. If we assume that the spacing of apertures 40, in each series, is approximately ¾", the adjustment of the roller mounting bracket with its roller assembly, from connection through one pair of apertures to the next adjacent pair of apertures in the top portion 23 of bracket 20, results in relatively fine vertical adjustment of the roller assembly in increments of approximately ⅛". When the roller mounting bracket 30, and the roller assembly carried thereby, is positioned with the apertures 33a, registering with a selected pair of apertures 40, said bracket and roller assembly is fixedly secured to the top portion 23, of the main supporting bracket 20, by means of a pair of bolts 42.

Since each unitary supporting and guiding device is preferably secured to a cross frame member by a single bolt 27, said device may also be adjusted laterally about the pivotal axis of the bolt to a desired position. By the range of selection of apertures 25 in the main supporting bracket 20 providing for main vertical adjustment, and the relatively fine vertical adjustment provided by the apertures 40, for cooperation with apertures in the roller mounting bracket 30, it is now possible to so position the hull engaging elements of the devices so as to insure firm and proper engagement with the hull of a boat in a manner to preclude rocking or wobbling of the boat when mounted in place on the trailer, and thus eliminates possible damage to the boat hull and/or the finished surface thereof.

By forming each of the boat supporting and guiding devices with three closely spaced apart rollers, the boat is properly guided and supported while being moved onto and off of the trailer, as well as when mounted on the trailer. Furthermore, the construction insures contact of the rollers with any contoured portion of the boat hull, even when it is provided with external ribs.

Although we have herein shown and described a preferred embodiment of our invention, manifestly it is capable of modification and rearrangement of parts without departing from the spirit and scope thereof. We do not, therefore, wish to be understood as limiting the present invention to the specific construction herein disclosed, except as we may be so limited by the appended claims.

We claim as our invention:

1. In a boat trailer, a main longitudinal frame, a cross frame member extending transversely of and secured to the main frame, and combination boat supporting and guiding devices secured to the cross frame member, at opposite sides of the main frame, each device comprising a supporting bracket having an upwardly extending leg portion and a top portion inclined relative to said leg portion, boat hull engaging means carried on said top portion, and means for adjustably securing said engaging means at a selected position, longitudinally along said top portion.

2. In a boat trailer, a main longitudinal frame, a cross frame member extending transversely of and secured to the main frame, and combination boat supporting and guiding devices secured to the cross frame member, at opposite sides of the main frame, each device comprising a supporting bracket having an upwardly extending leg portion and a top portion inclined relative to said leg portion, boat hull engaging means carried on said top portion, said top portion having a series of longitudinally spaced apart apertures, and a fastening element extending through one of said apertures and connecting to said boat hull engaging means.

3. In a boat trailer, a main longitudinal frame, a cross frame member extending transversely of and secured to the main frame, and combination boat supporting and guiding devices secured to the cross frame member, at opposite sides of the main frame, each device comprising a supporting bracket having an upwardly extending leg portion and a top portion inclined relative to said leg portion, boat hull engaging means carried on said top portion, comprising a roller mounting bracket and roller means carried on said mounting bracket, and means for adjustably securing said roller mounting bracket at a selected position, longitudinally along said top portion of said supporting bracket.

4. In a boat trailer, a main longitudinal frame, a cross frame member extending transversely of and secured to the main frame, and combination boat supporting and guiding devices secured to the cross frame member, at opposite sides of the main frame, each device comprising a supporting bracket having an upwardly extending leg portion and a top portion inclined relative to said leg portion, said leg portion having a series of longitudinally spaced apart apertures, a bolt extending through a selected aperture and connected to the cross frame member for positioning said top portion in a desired relation to the cross frame member, boat hull engaging means carried on said top portion, and means for adjustably securing said engaging means at a selected position, longitudinally along said top portion.

5. In a boat trailer, a main longitudinal frame, a cross frame member extending transversely of and secured to the main frame, and combination boat supporting and guiding devices secured to the cross frame member, at opposite sides of the main frame, each device comprising a supporting bracket having an upwardly extending leg portion and a top portion inclined relative to said leg portion, boat hull engaging means carried on said top portion, comprising a U-shaped mounting bracket, a shaft journaled in the upright legs of said mounting bracket, three closely spaced rollers carried on said shaft, one of said rollers being positioned between said upright legs, and means for adjustably securing said engaging means at a selected position, longitudinally along said top portion.

6. In a boat trailer, a main longitudinal frame, a cross frame member extending transversely of and secured to the main frame, and combination boat supporting and guiding devices secured to the cross frame member, at opposite sides of the main frame, each device comprising a supporting bracket having an upwardly extending leg portion and a top portion inclined relative to said leg portion, boat hull engaging means carried on said top portion, said top portion having two parallel series of longitudinally spaced apart apertures with the apertures of one series being staggered in longitudinal offset relation to the apertures of the other series, and fastening means extending through one of said apertures and said boat hull engaging means at a selected position longitudinally along said top portion of said supporting bracket.

7. In a boat trailer, a main longitudinal frame, a cross frame member extending transversely of and secured to the main frame, and combination boat supporting and guiding devices secured to the cross frame member, at opposite sides of the main frame, each device comprising a supporting bracket having an upwardly extending leg portion and a top portion inclined relative to said leg portion, said upwardly extending leg portion having two parallel series of longitudinally spaced apart apertures with one series of apertures being staggered in longitudinal offset relation to the apertures of the other series, boat hull engaging means carried on the top portion of the bracket, and means extending through a selected aperture of one of the two series of apertures and connected to the cross frame member for locating said bracket and disposing said hull engaging means at a desired position of vertical adjustment.

8. In a boat trailer, a main longitudinal frame, a cross frame member extending transversely of and secured to the main frame, and combination boat supporting and guiding devices secured to the cross frame member, at opposite sides of the main frame, each device comprising a supporting bracket having an upwardly extending leg portion and a top portion inclined relative to said leg portion, boat hull engaging means carried on said top portion, said top portion having two parallel series of longitudinally spaced apart apertures with the apertures of one series being staggered in longitudinal offset relation to the apertures of the other series, said upwardly extending leg portion of the bracket having two parallel series of longitudinally spaced apart apertures with the apertures of one series being disposed in staggered offset longitudinal relation to the apertures of the other series, and means extending through a selected aperture of one of the two last mentioned series of apertures and connected to the cross frame member for supporting said bracket at a desired position of vertical adjustment.

References Cited in the file of this patent

UNITED STATES PATENTS

| | | |
|---|---|---|
| 2,691,534 | Sampsell | Oct. 12, 1954 |
| 2,765,941 | Mamo | Oct. 9, 1956 |